(No Model.)

H. P. BOOTH.
PNEUMATIC BRAKE FOR VEHICLES.

No. 536,261. Patented Mar. 26, 1895.

Witnesses:

Inventor
Henry P. Booth
by Frank L. Ayer
Atty.

UNITED STATES PATENT OFFICE.

HENRY P. BOOTH, OF WEST SUPERIOR, WISCONSIN.

PNEUMATIC BRAKE FOR VEHICLES.

SPECIFICATION forming part of Letters Patent No. 536,261, dated March 26, 1895.

Application filed July 5, 1894. Serial No. 516,639. (No model.)

*To all whom it may concern:*

Be it known that I, HENRY P. BOOTH, a citizen of the United States, residing at West Superior, in the county of Douglas and State of Wisconsin, have invented certain new and useful Improvements in Pneumatic Brakes for Vehicles; and I do hereby declare the following to be a full, clear, and exact description of the invention, which will enable others skilled in the art to which it appertains to make and use the same.

My invention relates to improvements in brakes for bicycles, tricycles and other vehicles, and the object of the invention is to provide a pneumatic brake or brake operated by compressed air or atmospheric pressure, which will be simple and cheap in construction, easily applied to the vehicle with which it is to be used, and effective and durable in use.

For a better understanding of the invention attention is directed to the accompanying drawings, forming part of this specification, in which—

Figure 1:
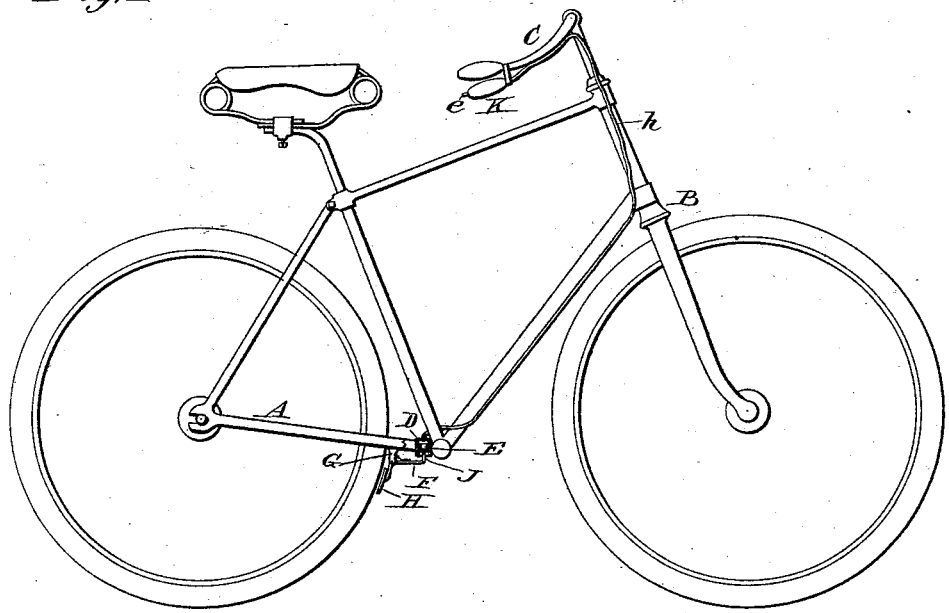
Figure 2:
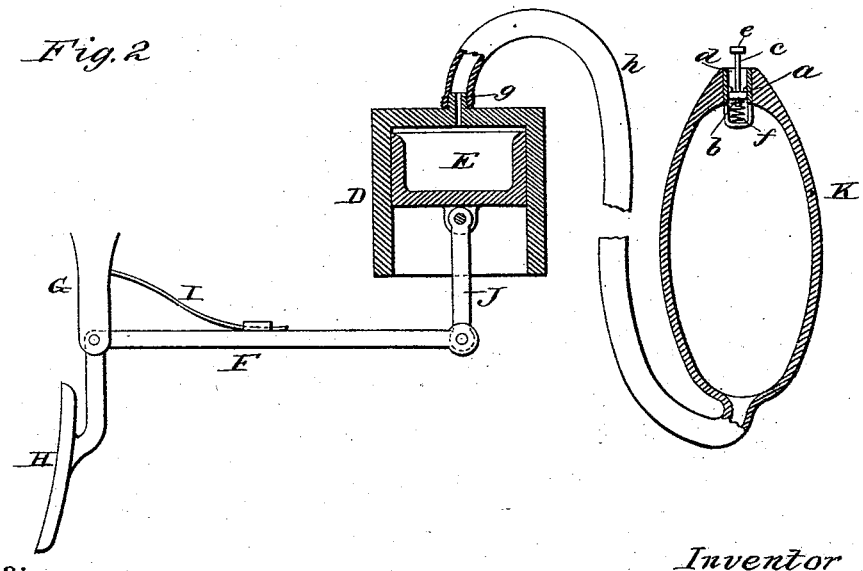

Figure 1, is a side elevation partly in section of a bicycle with my improved brake attached thereto, and with the driving mechanism removed, and Fig. 2, an enlarged section of the operative parts of my improved brake.

In both of the above views corresponding parts are designated by the same letters of reference.

Although I have shown my improved brake in connection with a bicycle of a representative type, and will so describe it, it is to be understood that the invention is capable of effective use in connection with bicycles, quadracycles, and other wheeled vehicles.

The bicycle shown in Fig. 1, is provided with a frame A, carrying the rear driving wheel, and with a fork B, pivoted to said frame A, and carrying the front wheel. The said fork B, is provided with a handle bar C, at or near its upper end, by means of which the bicycle may be steered.

D, is a small cylinder, open at its lower end, and supported from the frame A, preferably from the lower brace rod thereof, as shown. Mounted within the cylinder D, is a piston E, adapted to reciprocate therein. This piston, E, is preferably of the well known plunger type as illustrated, such construction being advantageous since no packing is necessary, and the piston is always centered in the cylinder. By inverting the cylinder D, as shown, it cannot become clogged up with dust and dirt.

F, is a right angled lever, pivoted in a hanger or hangers G, made preferably integral with the frame A. The short vertical arm of this lever F is provided with a brake shoe H, thereon, normally out of engagement with the tire of the rear driving wheel, but adapted to be engaged therewith when desired. The said brake shoe is kept in such normal position, *i. e.*, immediately out of contact with the rear wheel, by means of a spring, such as the leaf spring I, mounted on the bracket or hanger G.

The longer horizontal arm of the lever F is connected to the piston E, by means of a short connecting rod J. The mechanism above described comprises the brake applying device, by means of which the brake may be applied or withdrawn as may be required, and as I shall presently describe.

Mounted upon and carried by the handle bar C of the bicycle is the device for compressing air, and supplying such compressed air to the cylinder D. This device preferably consists simply of a rubber bulb K, mounted on the handle bar C, by preference directly under one of the handles or grips, so that said bulb may be conveniently grasped and compressed by the hand of the rider. A cylinder having a compressing piston therein is the equivalent of the bulb K, but is more expensive and bulky, and is liable to leak and get out of order.

The bulb K is provided on its interior with a metal seat *a*, having a small puppet valve *b* engaging therewith, the stem *c*, of such valve extending out through the air passage *d*, and provided with a finger piece *e*, by means of which the valve *b*, may be unseated against the tension of the spring F. The cylinder D is provided on its upper head with an air nipple *g*, of well known construction, having a passage therein of smaller diameter than the air passage *d*, into the bulb K. Connecting the bulb K with the nipple *g* is a pipe or tube *h*, which is preferably arranged adjacent to the frame, and is secured thereto in any suitable way. This pipe or tube is made preferably of rubber, in order not to interfere with the proper steering of the bicycle; but it may be a metal tube, provided adjacent to the steering head with a rubber section for the same purpose, in lieu of which, however, an ordinary swivel joint may be used.

It is evident, that instead of making use of a separate tube or pipe from the bulb K to the cylinder, the ordinary tubular frame of the machine may be availed of.

My device operates as follows: When it is desired to apply the brake, the bulb K is compressed, and the air originally therein is forced under pressure into the cylinder D, and moving the piston E, downward, will cause the brake shoe H to engage with the tire, and arrest the movement, of the rear wheel. When one compression of the bulb K is insufficient to apply the brake shoe with sufficient power, such bulb may be compressed successively any desired number of times, and, since the passage in the nipple $g$ is smaller than the passage $d$ into the bulb, air under pressure will be constantly supplied to the cylinder D until the desired result is obtained.

In releasing the brake, it is generally sufficient to allow the bulb K to expand, but for a sudden release, or when the brake has been very powerfully applied, the valve $b$ may be unseated, as before explained, and the spring I, will rapidly return the brake shoe to its normal position.

It is evident that my improvement is applicable to band-brakes working on the hubs of wheels, or to other devices for arresting the motion of wheels; and it is further evident that the valve 6, in the bulb may be reversed, so as to open when the bulb is being compressed, whereby air will be exhausted from the cylinder D, and the piston E, will be moved upward by atmospheric pressure, it being necessary of course, to mount the lever F in such a way, that the brake will be applied when the piston E is thus elevated.

Having now described my invention, what I claim therein, and desire to secure by Letters Patent, is as follows:

1. An improved air brake for vehicles, comprising a brake cylinder, a piston mounted therein and connected with the brake, and a compressing or exhausting device, operated by hand, for supplying air to or exhausting air from the brake cylinder, substantially as described.

2. An improved air brake for vehicles, comprising a brake cylinder, a piston mounted therein and connected with the brake, and a bulb K, provided with the valve $b$ therein, and connected with said brake cylinder, substantially as described.

3. An improved air brake for vehicles, comprising a brake cylinder, a piston mounted therein, and connected with the brake, and a bulb K, provided with the valve $b$, having the finger piece $e$, and connected with said brake cylinder, substantially as described.

4. An improved air brake for bicycles, comprising a brake cylinder D, mounted adjacent to the rear driving wheel; piston E, therein; right-angled lever mounted on the frame, and carrying the brake shoe H; connecting rod J, connecting the piston E and lever F; air nipple $g$, on the brake cylinder; bulb K, on the handle bars; seat $a$ therein; valve $b$, on said seat; finger piece $e$, connected with said valve; air passage $d$, in said bulb, of larger diameter than the air passage in the nipple $g$, for the purpose mentioned; and the pipe or tube $h$, connecting said bulb and said brake cylinder, substantially as described.

In testimony whereof I affix my signature in presence of two witnesses.

HENRY P. BOOTH.

Witnesses:
 DAN. MCCARTY,
 THOS. E. LYONS.